(12) United States Patent
Duarte et al.

(10) Patent No.: US 7,091,957 B2
(45) Date of Patent: Aug. 15, 2006

(54) DIRECTIONAL PAD HAVING INTEGRATED ACOUSTIC SYSTEM AND LIGHTING SYSTEM

(75) Inventors: Matias Duarte, San Francisco, CA (US); Joseph Palmer, San Jose, CA (US); Todd Lewis, Mountain View, CA (US); David Northway, San Carlos, CA (US); Andrew Zee, San Carlos, CA (US)

(73) Assignee: Danger, Inc., Palo Alto, CA (US)

( * ) Notice: Subject to any disclaimer, the term of this patent is extended or adjusted under 35 U.S.C. 154(b) by 383 days.

(21) Appl. No.: 10/718,749

(22) Filed: Nov. 21, 2003

(65) Prior Publication Data

US 2005/0068306 A1  Mar. 31, 2005

Related U.S. Application Data

(60) Provisional application No. 60/507,257, filed on Sep. 29, 2003.

(51) Int. Cl.
*G09G 5/00* (2006.01)
*G09G 5/08* (2006.01)
(52) U.S. Cl. ............... 345/169; 345/156; 345/157; 345/160
(58) Field of Classification Search ........ 345/156–170, 345/173–179; 178/18.01–18.07, 19.01–19.06

See application file for complete search history.

(56) References Cited

U.S. PATENT DOCUMENTS

| | | | |
|---|---|---|---|
| 6,580,932 B1 * | 6/2003 | Finke-Anlauff | 455/566 |
| 6,850,226 B1 * | 2/2005 | Finke-Anlauff | 345/169 |
| 2002/0044136 A1 * | 4/2002 | Griffin et al. | 345/169 |
| 2002/0149567 A1 * | 10/2002 | Griffin et al | 345/169 |
| 2003/0122784 A1 * | 7/2003 | Shkolnikov | 345/169 |

* cited by examiner

*Primary Examiner*—Vijay Shankar
(74) *Attorney, Agent, or Firm*—Blakely, Sokoloff, Taylor & Zafman, LLP (57) ABSTRACT

An apparatus for use in a data processing device is described in which an audio system and a light system is embedded within a cursor control device such as a directional pad. In one embodiment, the apparatus comprises a cursor control device for performing one or more defined cursor control functions; an audio system embedded within the cursor control device, the audio system configured to generate audio signals responsive to audio signals received and/or generated by the data processing device; and a light source embedded within the cursor control device, the light sources configured to generate light from the cursor control device responsive to control signals generated by the data processing device.

29 Claims, 8 Drawing Sheets

DIRECTIONAL PAD HAVING INTEGRATED ACOUSTIC SYSTEM AND LIGHTING SYSTEM

PRIORITY

This application claims priority from the provisional application entitled DATA PROCESSING DEVICE HAVING MULTIPLE MODES AND MULTIPLE ASSOCIATED DISPLAY/KEYBOARD CONFIGURATION, Ser. No. 60/507,257, Filed Sep. 29, 2003.

BACKGROUND OF THE INVENTION

1. Field of the Invention

This invention relates generally to the field of data processing input devices. More particularly, the invention relates to an input device having an integrated speaker and lighting system.

2. Description of the Related Art

Portable data processing devices such as Personal Digital Assistants ("PDAs") and programmable wireless telephones are becoming more powerful every day, providing users with a wide range of applications previously only available on personal computers. At the same time, due to advances in silicon processing technology and battery technology, these devices may be manufactured using smaller and smaller form factors. Accordingly, users no longer need to sacrifice processing power for portability when selecting a personal data processing device.

Although processing devices with small form factors tend to be more portable, users may find it increasingly difficult to interact with them. For example, entering data may be difficult due to the absence of a full-sized keyboard and reading information may be difficult due to a small, potentially dim Liquid Crystal Display ("LCD"). Moreover, given the fact that telephony and data processing functions may require different types of input/output elements (e.g., directional pads, telephony speakers, light emitting diodes, . . . etc), the real estate on the external surface of data processing devices is at a premium. Accordingly, to the extent possible, it is desirable to integrate multiple input/output functions into a single input/output device.

SUMMARY

An apparatus for use in a data processing device is described in which an audio system and a light system is embedded within a cursor control device such as a directional pad. In one embodiment, the apparatus comprises a cursor control device for performing one or more defined cursor control functions; an audio system embedded within the cursor control device, the audio system configured to generate audio signals responsive to audio signals received and/or generated by the data processing device; and a light source embedded within the cursor control device, the light sources configured to generate light from the cursor control device responsive to control signals generated by the data processing device.

BRIEF DESCRIPTION OF THE DRAWINGS

A better understanding of the present invention can be obtained from the following detailed description in conjunction with the following drawings, in which:

FIGS. 1–2a and 2b illustrate exemplary data processing devices on which embodiments of the invention may be employed.

DETAILED DESCRIPTION OF PREFERRED EMBODIMENTS

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

An integrated directional pad, acoustic system and lighting system for a data processing device is described below. As will be apparent from this description, the integrated device is particularly beneficial when employed on a multi-purpose data processing device such as a personal digital assistant ("PDA") or other mobile computing device having integrated wireless telephony capabilities (e.g., a combination PDA and cell phone). It should be noted, however, that the underlying principles of the invention are not limited to a wireless PDA/telephony configuration.

An Exemplary Data Processing Device

Figure 1:
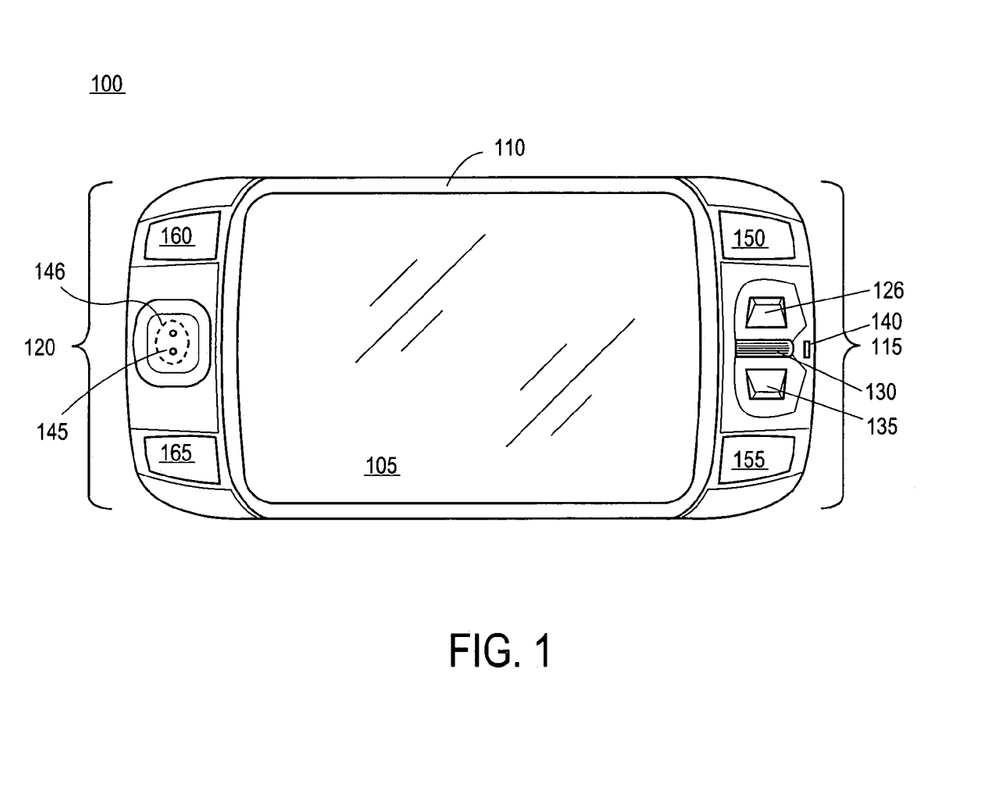
Figure 2A:
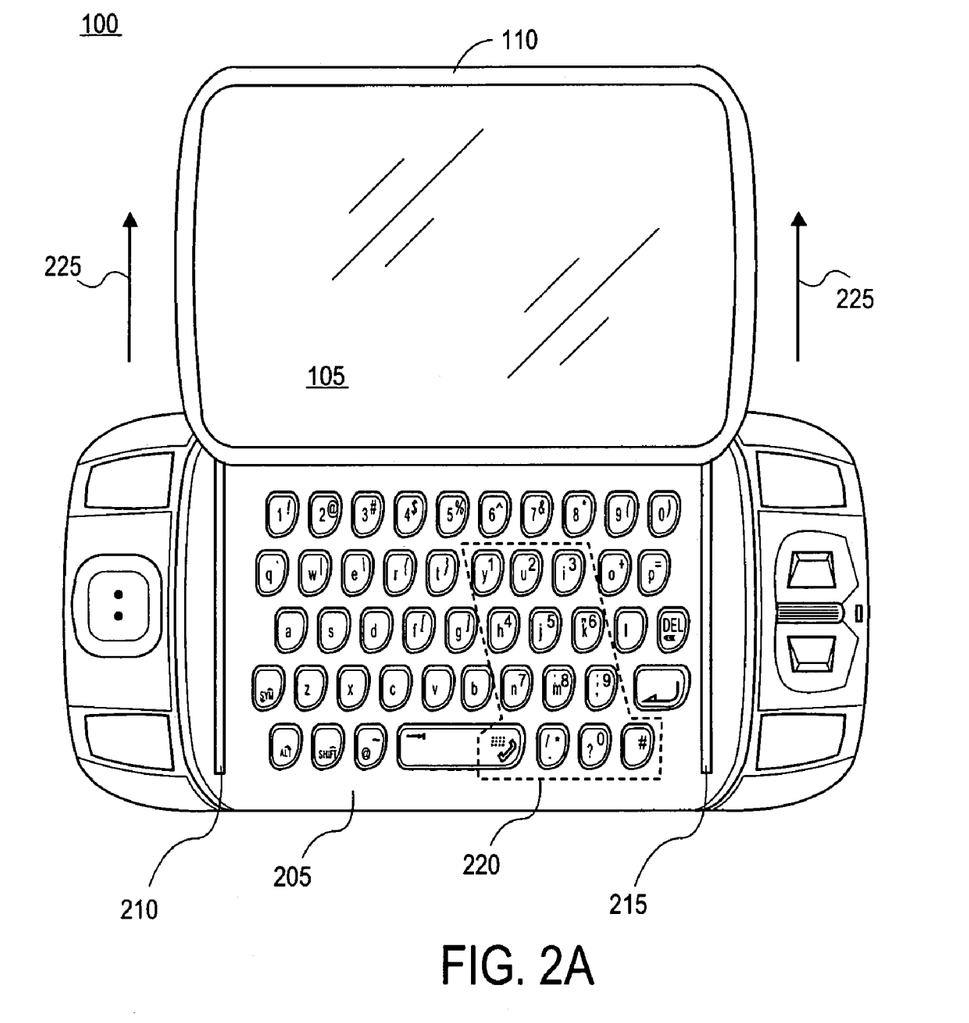
Figure 2B:
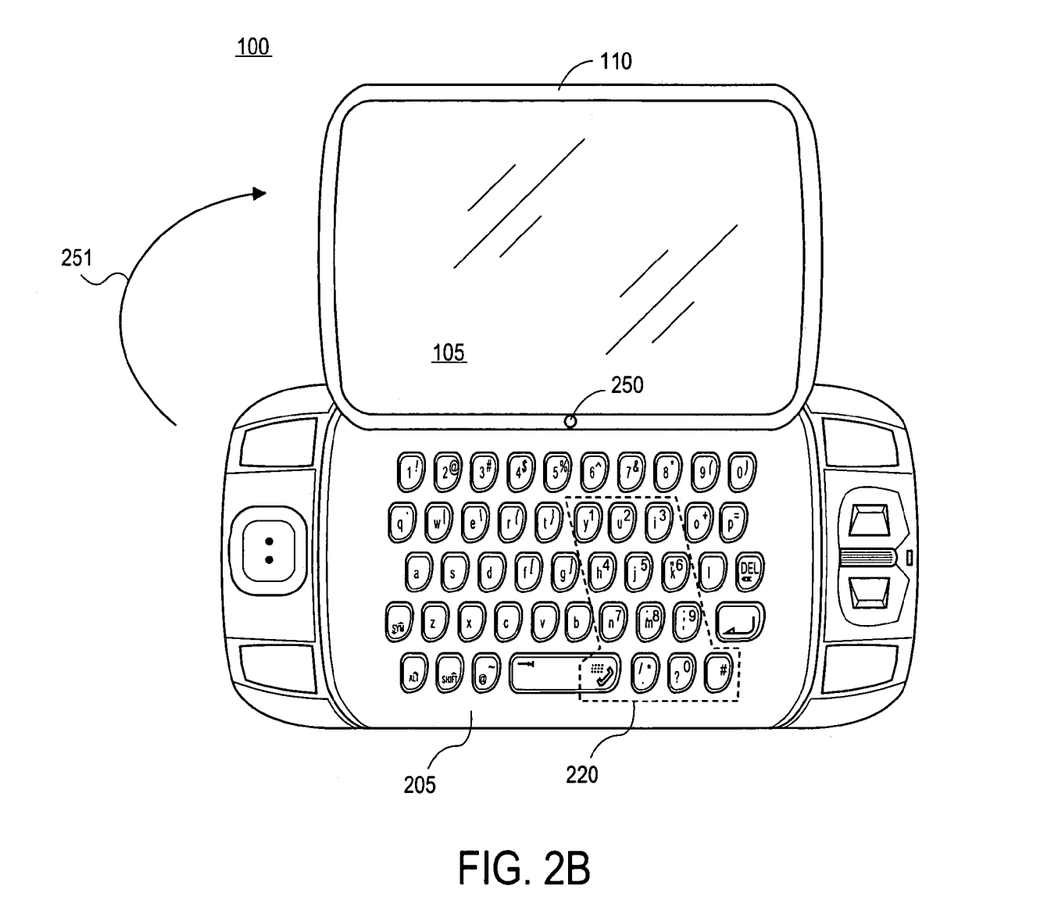

An exemplary data processing device on which embodiments of the invention may be employed is illustrated in FIGS. 1, 2a and 2b. The exemplary data processing device 100 comprises a display 110 with a viewable display area 105 for displaying various types of text and graphics. The illustrated data processing device 100 includes a plurality of different modes of operation which may be associated with a respective plurality of display and/or device orientations. In the first mode of operation, the display is viewed in a first position, illustrated generally in FIG. 1 in which it covers an alphanumeric keyboard 205 illustrated in FIGS. 2a–b. In this first position, the display is located flush within the boundary defined by the non-display portions of the data processing device 100.

By contrast, when the display is in the position illustrated in FIGS. 2a–b, the alphanumeric keyboard 205 is exposed and usable for data entry. In the embodiment illustrated in FIG. 2a, the display 110 slides from the first position to the second position in a direction substantially parallel to a plane defined by the front surface of the data processing device 100, as indicated by motion arrows 225. The sliding motion may be accomplished via pins or posts (not shown) on the backside of the display 110 that are engaged with tracks 210, 215 located on the face of the data processing device 100 to the left and right of the alphanumeric keyboard 205, respectively.

Various additional/alternative mechanisms may be used to guide the display from the first position to the second position (and vice versa). For example, in the embodiment illustrated in FIG. 2b, the display rotates around a pivot point 250 from the first position to the second position, as indicated by motion arrow 251. Of course, the underlying principles of the invention are not limited to any particular mechanism for adjusting the display 110.

In one embodiment, the data processing device 100 includes a first set of control elements 115 positioned to the right of the display 110 and a second set of control elements 120 positioned to the left of the display (i.e., to the "right" and "left" while the display in the orientation illustrated in FIG. 1). In one embodiment, the first set of control elements 115 includes a control wheel 130 positioned between two control buttons, 126 and 135, as illustrated. As in prior embodiments of the invention, the control wheel 130 may be used to move a cursor control device, highlight bar or other selection graphic on the display to select menu items, program icons and/or other graphical or textual display elements. In one embodiment, the control wheel 130 is made of clear plastic with an light emitting diode ("LED") or other light source embedded therein.

In one embodiment, the first control button 126, located above the control wheel 130, is a "page up" button for generating "page up" control functions. For example, when a word processing document, Web page, email message or other type of document is displayed in the foreground of the display 110, selection of the first control button 126 will jump upward through the displayed data/images by a full display screen's worth of data/images. When navigating through menus, selection of the first control button 126 may cause a selection element to jump multiple menu items or other graphical elements. Various different/additional "page up" functions may be trigged via the first control button 126 while still complying with the underlying principles of the invention. The second control button 135, located below the control wheel 130, is a "page down" button for generating "page down" control functions (e.g., which operate in the same manner as the "page up" control functions but in the opposite direction).

In one embodiment, a series of additional control elements 150, 155, 160, and 20 are configured on the data processing device 100 to provide various additional preprogrammed and/or user-specified control functions. For example, a control element 150 may be a designated "home" key for jumping to the data processing device's main menu, or performing application-specific functions typically associated with a "home" key (e.g., moving a cursor to the beginning of a line in a word processing document). Control element 155 may be a dedicated a "menu" key which generates a context-specific menu when selected (e.g., a different menu may be generated based on which application is currently running). Control keys 160 and 165 may be designated "jump" keys, allowing the user to easily jump to (i.e., execute) a designated application program. The control elements 150, 155, 160 and 165 may be programmed for various alternate and/or additional functions while still complying with the underlying principles of the invention.

In one embodiment, the second set of control elements includes a directional pad 145 having an integrated speaker 146 and/or light source, as described in detail below with respect to FIGS. 3–7. The directional pad 145 may be used to move a cursor or other selection graphic in any direction on the display to enable selection of menu items, program icons and other graphical or textual display elements. The directional pad 145 may be made of frosted translucent plastic and may be white in color, although other materials and colors may be used. An LED contained in on embodiment of the directional pad may be a tri-color LED that generates a variety of colors to alert the user when an incoming message has been received. In "telephony mode" (described below), the speaker 146 contained in the directional pad 145 enables the user to hear the party on the other end of a call. In addition, a microphone 140 is configured at the end of the data processing device 100 opposite the speaker 146 so that the data processing device 100 may be held like a mobile phone while in telephony mode (i.e., when the speaker placed next to the user's ear, the microphone is located in the proximity of the user's mouth).

In one embodiment, when in "telephony mode" the functions performed by the various control elements 115,120 and/or keys on the keypad 205 change to designated telephony functions. For example, in the telephony mode of operation, the control button 126 above the scroll wheel may function as a "call" button with which the user may initiate a telephone call once the number to be called has been entered. The control button 125 below the scroll wheel 130 may function as a "hang up" button, with which the user may conclude a telephone call. Similarly, referring to FIGS. 2a–b, to simplify numeric data entry when in telephony mode, a designated set of alphanumeric keys 220 from the keyboard 205 may change to a numeric keypad (e.g., the 'y' key may change to a '1' key, the 'u' key may change to a '2' key, . . . etc).

In addition, the glyphs on the control elements 115,120 and/or keys on the keypad 205 may change to reflect the change in operation in the same or a similar manner as described in the embodiments above. For example, light emitted by LEDs embedded within the control buttons 125 and 126 on either side of the scroll wheel 130 may be modified to reflect the change in operation in telephony mode. In one embodiment, for example, the "call" and "hang up" glyphs are highlighted on the control buttons 125 and 126, in contrast to "page up" and "page down" glyphs, respectively.

Figure 3:
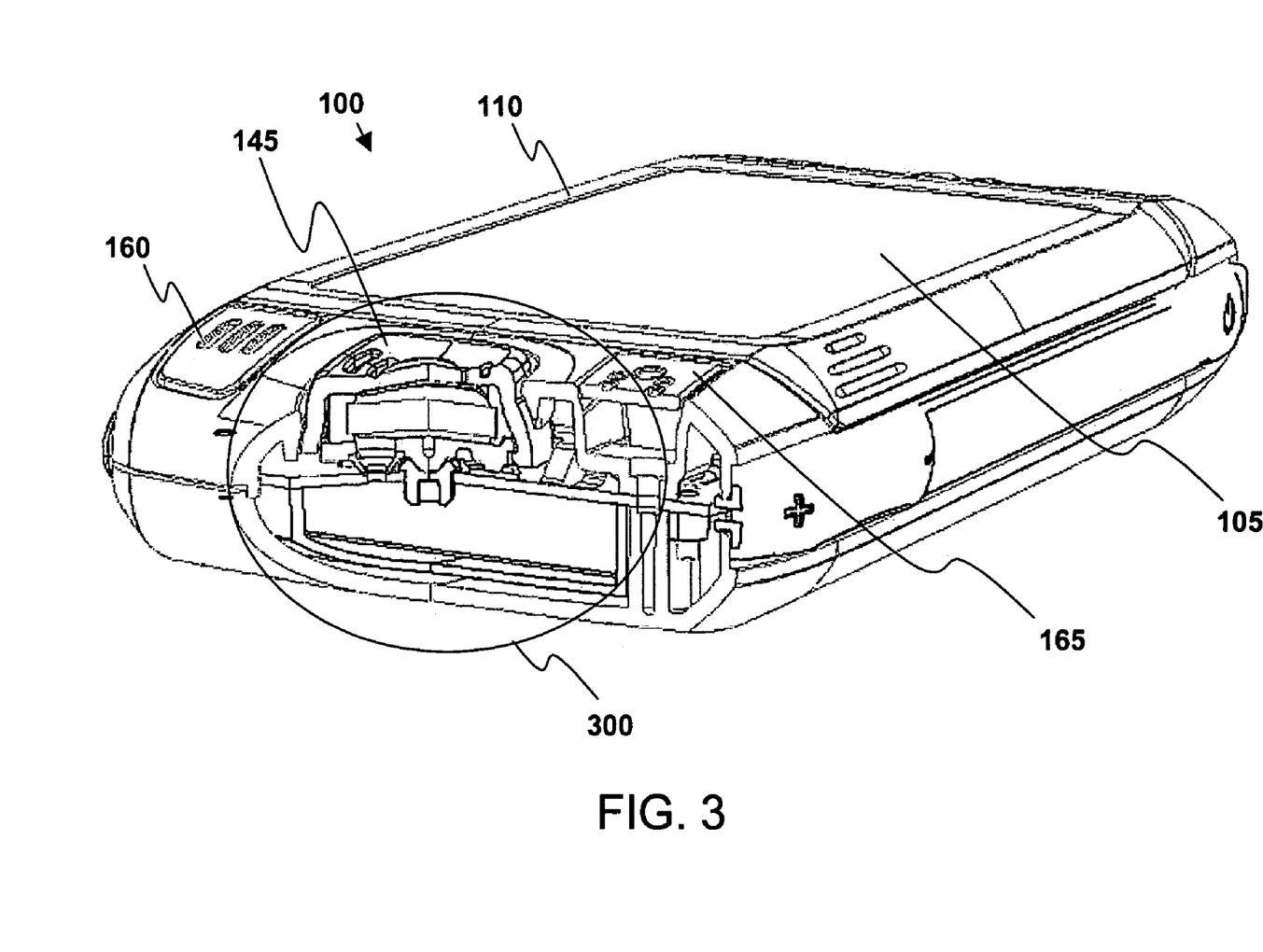
FIG. 3 illustrates a perspective view of the exemplary data processing device in which one embodiment of the invention is illustrated.

One Embodiment of an Integrated Directional Pad, Acoustic System and Light System One embodiment of the invention 300, illustrated in FIGS. 3–7, comprises an integrated directional pad, acoustic system and light system. FIG. 3 provides a high level view of the angled cross-section used to view the pertinent aspects of this embodiment of the invention (i.e., having both a diagonal component and a non-diagonal component). FIG. 3 also provides a high level view of the manner in which the directional pad, acoustic system and light system may be embedded within a data processing device 100.

Figure 4:
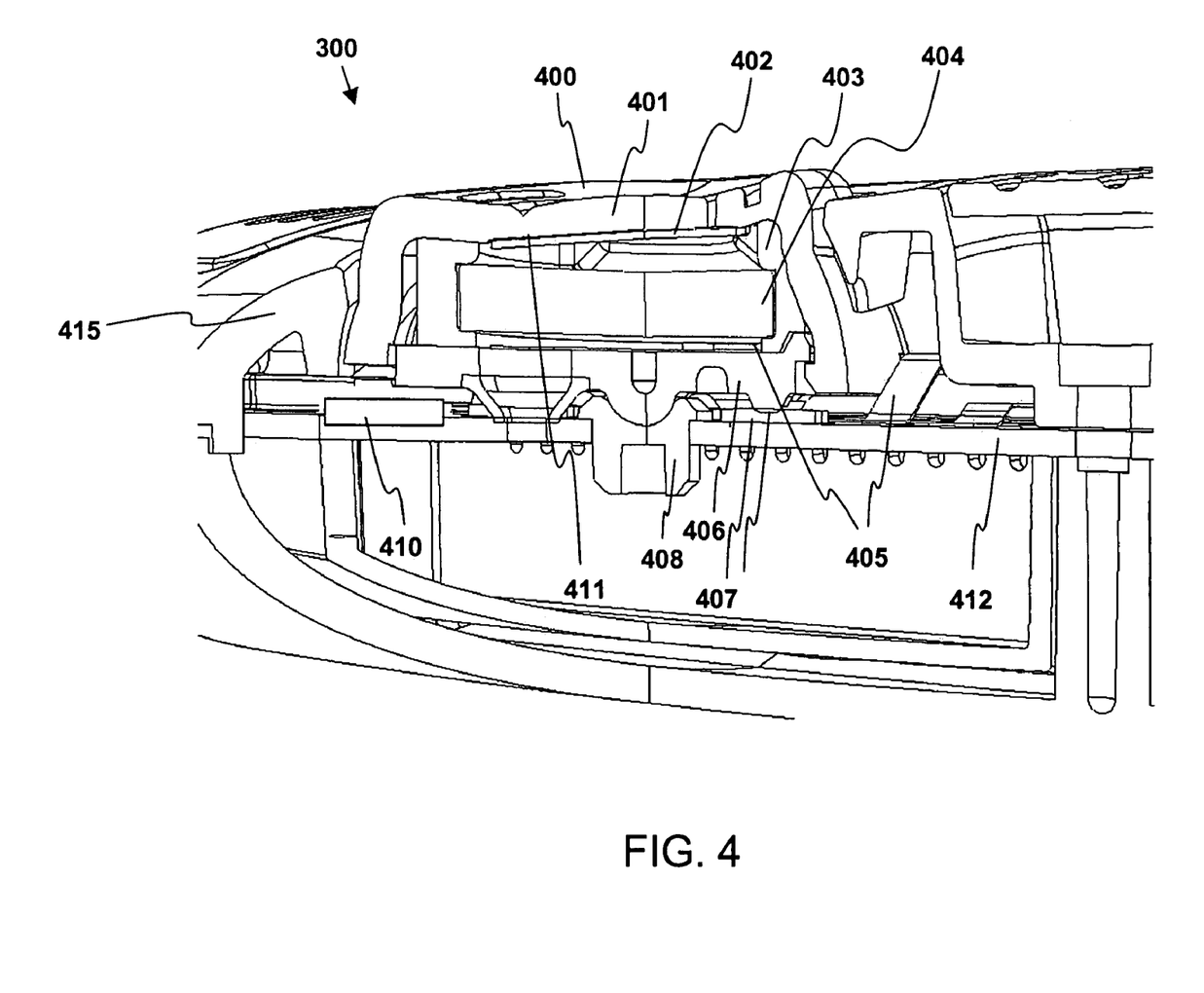
FIG. 4 illustrates one embodiment of an integrated directional pad, speaker and light emitting diode.

The directional pad 145 of this embodiment is comprised of a button shell 401 having an external surface 400 (i.e., exposed to the end user) and an inner surface 411. In one embodiment, a protective mesh layer 402 is attached to inner surface 411 of the button shell 401 with adhesive. The protective mesh layer 402 separates the internal surface of the button shell 401 from an audio receiver unit 404, and provides protection for the audio receiver unit 404.

An audio receiver boot 403 is affixed to the internal surface of the button shell 401, as illustrated. An audio receiver unit 404 is inserted into the rubber boot 403, which secures the audio receiver unit 404 in place. In one embodiment, to manufacture the directional pad/audio receiver combination, the audio receiver unit 404 is first inserted into the rubber boot 403 and then the rubber boot 403/receiver 404 combination is affixed to the button shell 401. However, various manufacturing procedures may be employed while complying with the underlying principles of the invention.

In one embodiment, a flex circuit 405 is positioned onto mating details on an actuator platform 406, which is then snapped into the button shell 401. A micro-switch 407, gimble socket 408, acoustic chamber 409, and light emitting diode ("LED") 410 are all assembled to a printed circuit board ("PCB") 412. A center sphere 502 on the bottom of the actuator platform 406 is placed into the gimble socket 408. The flex circuit 405 is then inserted into a connector and is also assembled to the PCB 412. The top housing 415 drops down over the assembly and captures the button shell 401, as illustrated.

Directional Pad Operation

Figure 5:
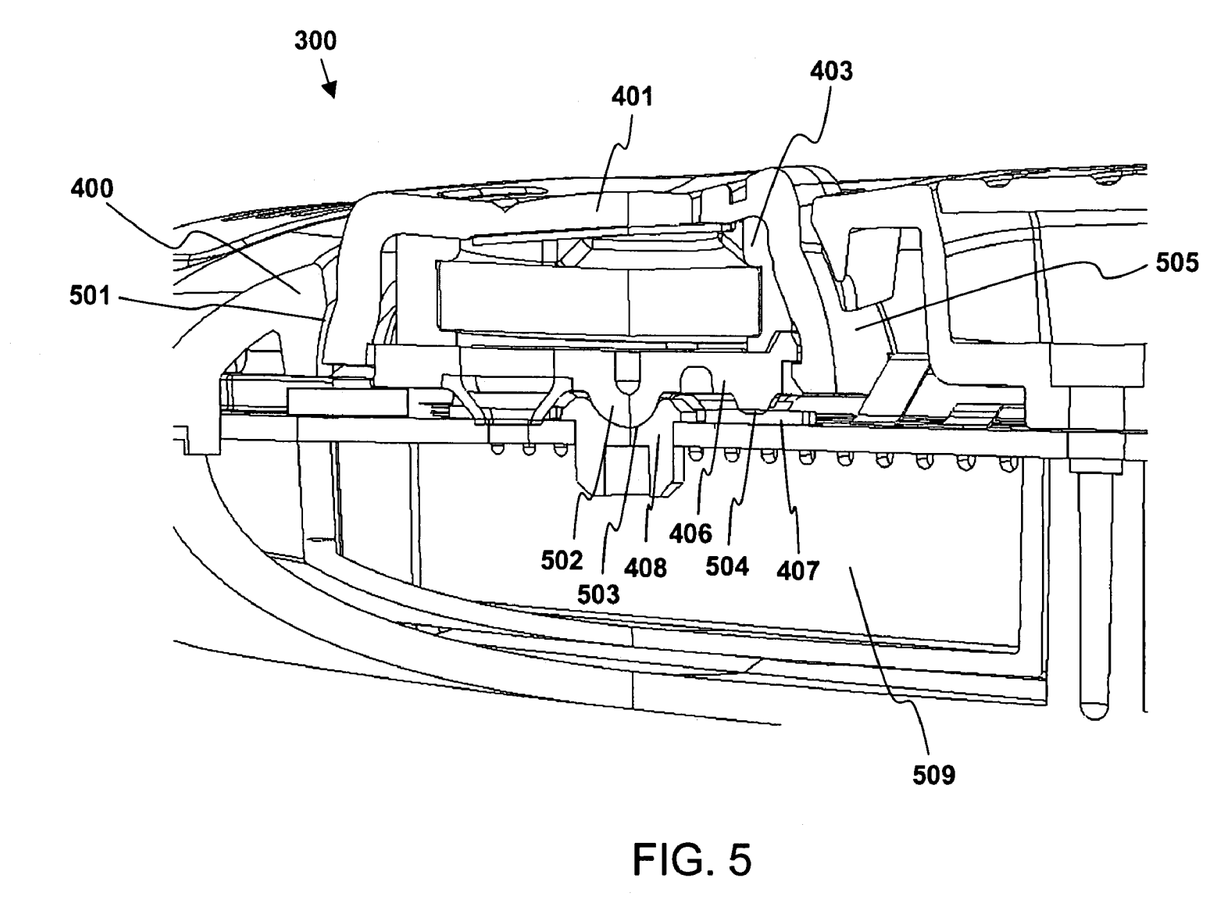
FIG. 5 illustrates elements associated with directional pad operation according to one embodiment of the invention.

Referring to FIG. 5, In one embodiment, because the center sphere 502 on the bottom of the actuator platform 406, the dish 503 of the gimble socket 408, the semi-spherical surface 505 of portions of the button shell 401, and the mating surfaces 501 of the button shell 401 all share the same center, the directional pad 145 tilts up to a specified number of degrees (e.g.,5 degrees) in any direction. In one embodiment, the tilting forces actuator bumps 504 placed at each of four equidistant quadrants on the bottom of the actuator platform 406 to activate each of four corresponding micro-switches 407, also placed at the quadrants around the gimble socket 408. This mechanism allows an end user to guide the cursor on the screen in any of four directions, corresponding to the four actuator bumps 504. It should be noted, however, that the underlying principles of the invention are not limited to a four-way directional pad or, for that matter, to any particular mechanism for inputting control signals to the data processing device.

Acoustic System Operation

Figure 6:
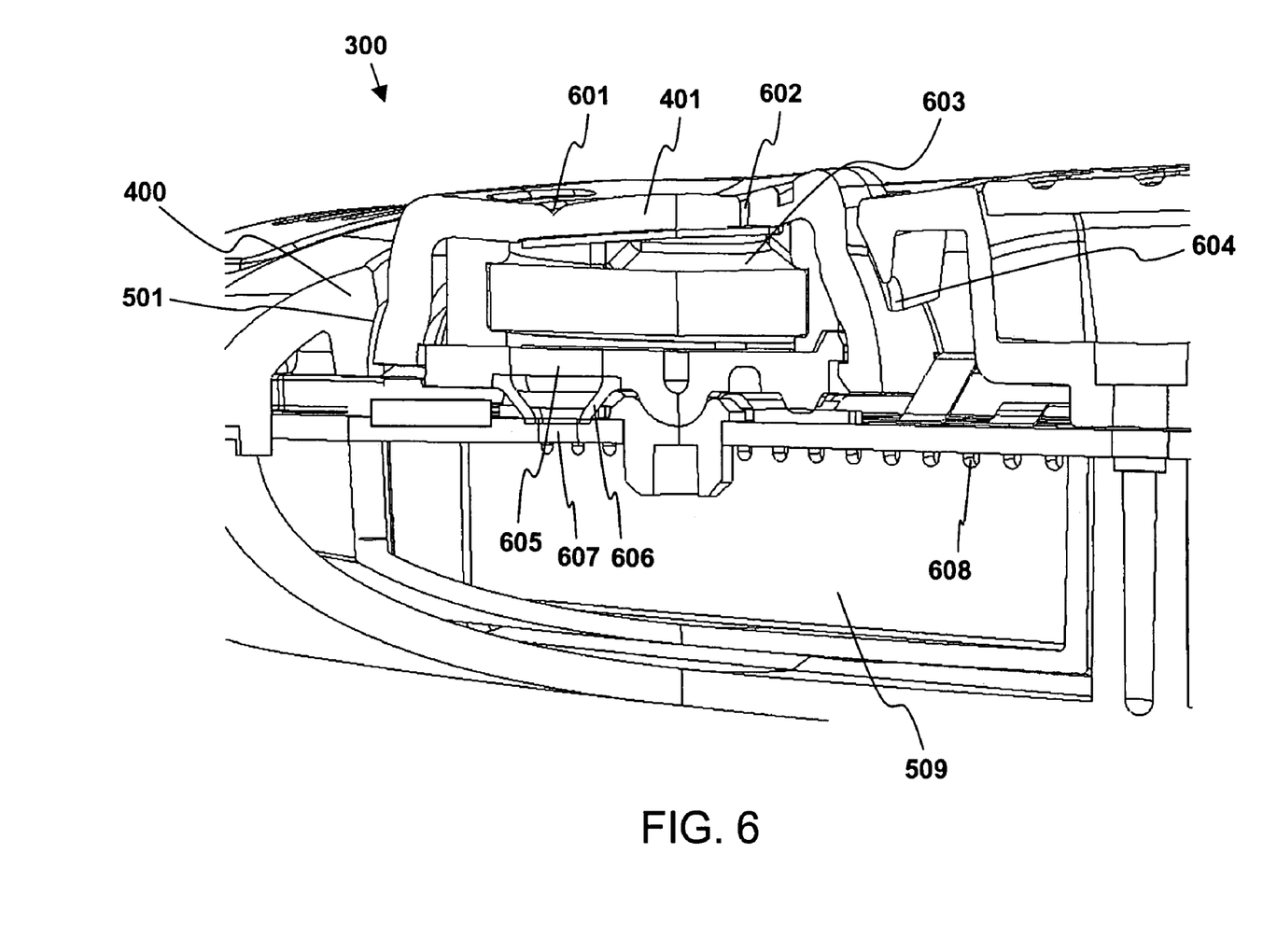
FIG. 6 illustrates elements associated with an integrated acoustic system employed in one embodiment of the invention.

Referring now to FIG. 6, the audible output from the audio receiver 404 fills the chamber 603 above it, passes through the protective mesh 402 and out through two holes, 601 and 602, in the button shell 401. In one embodiment, to optimize the audio output, a system of audio ports and chambers is provided on the under side of the audio receiver 404. Specifically, a large chamber of air 509 is configured behind the audio receiver 404 thereby allowing the speaker within the audio receiver 404 to generate sound efficiently. A plurality of port holes 605 couple the back of the audio receiver 404 to the air chamber 509. In the particular embodiment illustrated in FIG. 6, four port holes 605 are configured within the diagonals of the actuator platform (e.g., at or near each of the four corners). Of course, the underlying principles of the invention are not limited to any particular number of port holes 605.

In one embodiment, the port holes 605 are sealed to holes 607 in the PCB 412 by elastomer cones 606 which may be over-molded onto the actuator platform 406. The flexibility of the elastomer cones 606 allow the actuator platform 406 to tilt freely to perform the cursor control functionality described herein while maintaining the acoustic integrity of the audio port system. In this embodiment, the elastomer cones 606 act as springs, pushing the button shell 401 up into the top housing 415, thereby preventing rattling of the button shell 401 and maintaining the button level when no force is being applied to the top surface 400 of the button shell 401.

Air enters and exits the large air chamber 509 via a series of exit holes 608 along one edge of the chamber. In the particular embodiment shown in FIG. 6, the holes are directed into the inner volume of the data processing device 100. The air transmitted through to the inner volume may then exit to the outside of the data processing device 100 through two ports 604 configured between the button shell 401 and the top housing 415.

Light Pipe Operation

Figure 7:
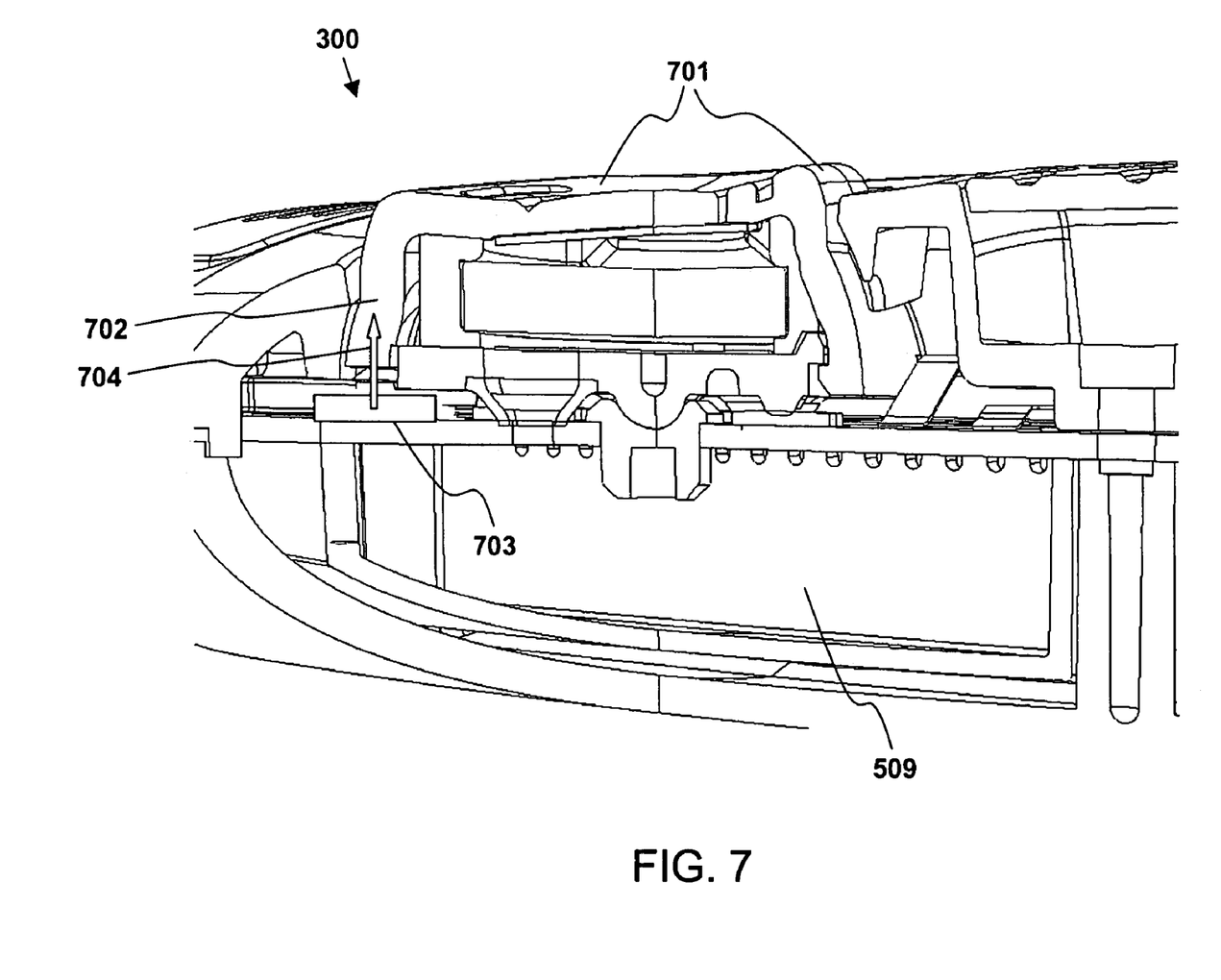
FIG. 7 illustrates elements associated with an integrated lighting system employed in one embodiment of the invention.

In one embodiment, one or more LEDs 703 are positioned underneath the button shell to illuminate the button shell under certain conditions (e.g., to announce an incoming call, email message, . . . etc). In one embodiment, the button shell 401 is molded in a clear plastic and the upper surfaces 701 are covered with a thin coat of paint (e.g., to match the color scheme of the data processing device 100). As such, light shining from the LEDs 703 passes through the polished walls 702 of the button shell 401, reflects within the button shell 401 and thereby illuminates the entire button shell. Because the light is reflected within the button shell 401, in one embodiment, only one or two LEDs are needed (e.g., positioned at adjacent corners of the button shell). However, the particular number of LEDs used is not pertinent to the underlying principles of the invention.

Throughout the foregoing description, for the purposes of explanation, numerous specific details were set forth in order to provide a thorough understanding of the invention. It will be apparent, however, to one skilled in the art that the invention may be practiced without some of these specific details. For example, while the embodiments described above employ LEDs as a light source, various different types of light sources may be employed while still complying with the underlying principles of the invention. In addition, although the embodiments of the invention described above use a four-way directional pad, the underlying principles of the invention may be implemented in cursor control devices having various capabilities (e.g., eight way directional pads, 360-degree multi-directional devices such as track pointers, . . . etc).

In other instances, well-known structures and techniques have not been shown in detail to avoid obscuring the underlying principles of the present invention. For example, certain details of the audio receiver 404 illustrated in FIGS. 3–7 have not been described in detail to avoid obscuring the pertinent aspects of the invention. Accordingly, the scope and spirit of the invention should be judged in terms of the claims which follow.

What is claimed is:

1. An apparatus for use in a data processing device comprising:

a cursor control device to perform one or more defined cursor control functions, the cursor control device comprising a directional pad configured to direct a cursor in specified directions responsive to a user input;

an audio system embedded within the cursor control device, the audio system to generate audio responsive to audio signals received and/or generated by the data processing device;

a light source embedded within the cursor control device, the light source to generate light responsive to control signals generated by the data processing device;

wherein the directional pad further comprises:

a button shell having an exterior surface and an interior surface;

an actuator platform coupled to the button shell, the actuator platform pivoting around a pivot point; and one or more switches interfacing with one or more points on the actuator platform, the switches communicatively coupled to generate control signals responsive to physical user input on the button shell.

2. The apparatus as in claim 1 wherein the audio system further comprises:
an audio receiver fixedly attached to an inside surface of the cursor control device, the audio receiver having a speaker for generating the audio responsive to the audio signals; and
a first air chamber adjacent to the audio receiver, the first air chamber positioned behind the speaker within the audio receiver.

3. The apparatus as in claim 2 further comprising:
a second air chamber adjacent to the audio chamber, the second air chamber positioned in front of the speaker within the audio receiver.

4. The apparatus as in claim 3 wherein the cursor control device includes one or more audio transmission holes directly adjacent to the second air chamber through which audio signals generated by the speaker within the audio receiver are transmitted.

5. The apparatus as in claim 2 further comprising:
one or more port holes coupling the first air chamber to the audio receiver.

6. The apparatus as in claim 5 further comprising:
a printed circuit board ("PCB") having a plurality of holes aligned with the port holes, wherein the port holes are sealed to the corresponding holes in the PCB by corresponding elastomer cones.

7. The apparatus as in claim 6 wherein the cursor control device is affixed to the PCB by the elastomer cones, wherein the elastomer cones deform and apply a counter force responsive to a force applied to the cursor control device.

8. The apparatus as in claim 5 further comprising one or more exit holes coupling the first air chamber to an inner volume within the data processing device.

9. The apparatus as in claim 1 wherein the light source comprises a light emitting diode ("LED").

10. The apparatus as in claim 9 wherein the cursor control device comprises an external surface exposed to and end user and an internal surface, the LED configured to shine light between the external surface and the internal surface to illuminate the cursor control device.

11. The apparatus as in claim 1 wherein the directional pad further comprises:
a boot fixedly coupled to the interior surface of the button shell; and
an audio receiver of the audio system fixedly inserted into the boot, the audio receiver to generate audio responsive to audio signals generated and/or received by the data processing device.

12. The apparatus as in claim 1 wherein the pivot point comprises a gimble socket.

13. An apparatus to be used in a data processing device comprising:
cursor control means for performing one or more defined cursor control functions, the cursor control device comprising a directional pad configured to direct a cursor in specified directions responsive to a user input;
audio system means embedded within the cursor control means, the audio system means to generate audio responsive to audio signals received and/or generated by the data processing device;
lighting means embedded within the cursor control means, the light source to generate light responsive to control signals generated by the data processing devices;
wherein the directional pad comprises:
a button shell having an exterior surface and an interior surface;
an actuator platform coupled to the button shell, the actuator platform pivoting around a pivot point; and
one or more switches interfacing with one or more points on the actuator platform, the switches communicatively coupled to generate control signals responsive to physical user input on the button shell.

14. The apparatus as in claim 1 wherein the directional pad further comprises:
a boot fixedly coupled to the interior surface of the button shell; and
an audio receiver of the audio system means fixedly inserted into the boot.

15. The apparatus as in claim 13 wherein the audio system further comprises:
an audio receiver fixedly attached to an inside surface of the cursor control device, the audio receiver having a speaker for generating the audio responsive to the audio signals; and
a first air chamber adjacent to the audio receiver, the first air chamber positioned behind the speaker within the audio receiver.

16. The apparatus as in claim 15 further comprising:
a second air chamber adjacent to the audio chamber, the second air chamber positioned in front of the speaker within the audio receiver.

17. The apparatus as in claim 16 wherein the cursor control device includes one or more audio transmission holes directly adjacent to the second air chamber through which audio signals generated by the speaker within the audio receiver are transmitted.

18. The apparatus as in claim 15 further comprising:
one or more port holes coupling the first air chamber to the audio receiver.

19. The apparatus as in claim 18 further comprising:
a printed circuit board ("PCB") having a plurality of holes aligned with the port holes, wherein the port holes are sealed to the corresponding holes in the PCB by corresponding elastomer cones.

20. The apparatus as in claim 19 wherein the cursor control device is affixed to the PCB by the elastomer cones, wherein the elastomer cones deform and apply a counter force responsive to a force applied to the cursor control device.

21. The apparatus as in claim 18 further comprising one or more exit holes coupling the first air chamber to an inner volume within the data processing device.

22. The apparatus as in claim 13 wherein the light source comprises a light emitting diode ("LED").

23. The apparatus as in claim 22 wherein the cursor control device comprises an external surface exposed to and end user and an internal surface, the LED configured to shine light between the external surface and the internal surface to illuminate the cursor control device.

24. An apparatus for use in a data processing device comprising:
a cursor control device to perform one or more defined cursor control functions;
an audio system embedded within the cursor control device, the audio system to generate audio responsive to audio signals received and/or generated by the data processing device;
a light source embedded within the cursor control device, the light source to generate light responsive to control signals generated by the data processing device;
wherein the audio system further comprises:

an audio receiver fixedly attached to an inside surface of the cursor control device, the audio receiver having a speaker for generating the audio responsive to the audio signals; and a first air chamber adjacent to the audio receiver, the first air chamber positioned behind the speaker within the audio receiver.

25. The apparatus as in claim 24 further comprising:
a second air chamber adjacent to the audio chamber, the second air chamber positioned in front of the speaker within the audio receiver.

26. The apparatus as in claim 25 wherein the cursor control device includes one or more audio transmission holes directly adjacent to the second air chamber through which audio signals generated by the speaker within the audio receiver are transmitted.

27. The apparatus as in claim 24 further comprising:
one or more port holes coupling the first air chamber to the audio receiver.

28. The apparatus as in claim 27 further comprising:
a printed circuit board ("PCB") having a plurality of holes aligned with the port holes, wherein the port holes are sealed to the corresponding holes in the PCB by corresponding elastomer cones.

29. The apparatus as in claim 28 wherein the cursor control device is affixed to the PCB by the elastomer cones, wherein the elastomer cones deform and apply a counter force responsive to a force applied to the cursor control device.

* * * * *